Nov. 12, 1957  S. L. ADELSON  2,813,169
CONTROL DEVICE
Filed Oct. 28, 1954
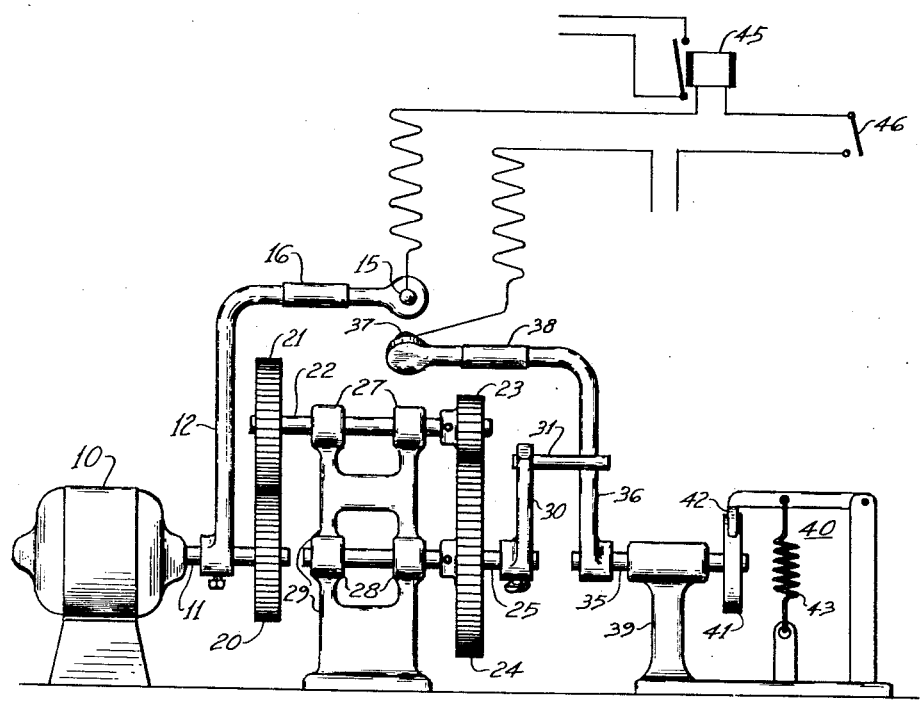

ର୍ଷ

2,813,169
CONTROL DEVICE

Samuel L. Adelson, Tucson, Ariz., assignor to Infilco Incorporated, Tucson, Ariz., a corporation of Delaware Application October 28, 1954, Serial No. 465,202

7 Claims. (Cl. 200—92)

This invention relates to a device for obtaining a signal when a variable condition has dropped to a predetermined percentage of a previously reached maximum value. The invention is particularly useful where the maximum value varies and is not predictable.

It is an object of this invention to provide a simple and accurate device for obtaining a signal when the value of a condition has dropped to a predetermined percentage of a previously reached maximum.

Another object is to provide a device of this general type wherein the maximum value reached by the condition in successive cycles of operation varies and is not predictable.

Another object is to provide a device of this general type which is adjustable with respect to the percentage of the maximum value at which the signal is obtained.

A specific object is to provide a device for obtaining a signal when the varying electrical conductivity of a liquid has fallen to a predetermined percentage of a previously reached maximum value.

Other objects of the invention will become apparent upon consideration of the detailed description and the claims which follow.

For purposes of illustration the invention will be described in connection with the electrical conductivity of a liquid as an example of the controlling condition, but it will be apparent that it applies to many other conditions which can be measured and the measured value be converted to movements of a rotatable shaft through corresponding angles.

The invention will be more readily understood by reference to the drawing which forms a part hereof and which shows a device according to the invention in front elevation.

The invention may be used in connection with a conventional conductivity meter which measures the electrical conductivity of a liquid, such as the effluent of a hydrogen ion exchanger, and indicates and records it. Such conductivity meters are well known in the art and need not be shown or described herein.

The numeral 10 indicates a reversible motor, which may be the motor of a conductivity meter or a motor of identical type connected in parallel with the motor of a conductivity meter.

On the motor or metering shaft 11 is fixed an arm 12, which carries at its outer end a contact 15. The contact 15 is insulated from the arm 12 by insulator 16. Also fixed to the shaft 11 is a gear 20. A second gear 21 meshes with gear 20, and is affixed to one end of a countershaft 22. Removably fixed to the other end of the countershaft 22 is a third gear 23. A fourth gear 24, meshing with gear 23, is removably fixed to a shaft 25, which is coaxial with motor or metering shaft 11. The ratio of the gears 20, 21, 23, and 24 is chosen so that the shaft 25 moves through an angle which is a predetermined percentage of the angular movement of metering shaft 11. The shafts 22 and 25 extend through bearings 27 and 28 that may be supported in any suitable manner, such as by a support 29.

Also affixed to the shaft 25, as by means of a set screw, is an arm 30 carrying a pin 31, or the pin 31 may be directly affixed to the gear 24 and the arm 30 omitted. A shaft 35 axially aligned with shaft 25 has fixed to one end an arm 36 carrying a contact 37. The contact 37 is insulated from the arm 36 by insulator 38. The shaft 35 extends through a bearing which is mounted on a support 39. The free movement of shaft 35 and arm 36 is retarded by a friction device 40 including a friction disk 41 on which acts a friction shoe 42 under the action of a spring 43.

Contacts 15 and 37 are connected in a power circuit, as shown. Also connected in this power circuit is a relay 45, or other device to be actuated when contacts 15 and 37 meet, and a timer-operated switch 46.

The operation of the device will be readily understood. When the conductivity of the liquid increases from a base point, the motor 10 turns the shaft 11 in one direction, say clockwise when viewed from the right side of the figure, through an angle corresponding to the increase in conductivity, and arm 12 and contact 15 are moved through the same angle. Thus, the angular movement of contact 15 from a base line is a measure of the conductivity. Simultaneously, the shaft 25, its arm 30, and the pin 31 will be moved clockwise through a lesser angle, the ratio of the angle through which shaft 25 travels relative to the angle through which shaft 11 is moved corresponding to the predetermined percentage below the maximum conductivity at which the signal is to be obtained. The pin 31 will push the arm 36 forward against the retarding force of the friction device 40. As shown in the drawing, the arms 12 and 36 are so shaped that the contacts 15 and 37 travel through the same path. At any point of travel of contacts 15 and 37 during an increase of conductivity and while the conductivity remains at the maximum value, there is a definite angular distance between the two contacts which equals the difference between the angular movement of arm 12 and the predetermined percentage of the angular movement of arm 12 at which the signal is to be obtained.

When the conductivity starts to decline, the motor reverses and moves the shaft 11, arm 12, and contact 15 in the opposite direction, say counterclockwise. Shaft 25, arm 30, and pin 31 are also moved counterclockwise at the predetermined lesser rate, and the pin 31 backs away from the arm 36, which remains in its then position due to the friction exerted by device 40, which prevents movement of the arm 36 by gravity. When the contact 15 on its reverse travel has passed through said angular distance between the two contacts, it engages contact 37. This closes the circuit through the contacts 15 and 37, and a signal is obtained. For purposes of illustration relay 45 is shown connected in the power circuit. The relay 45 will receive the signal and may be used to actuate an alarm, visual or audible or both, and to perform some work, such as to operate known means for stopping the run through the hydrogen exchanger and initiate its regeneration. Obviously the signal obtained by closing of the power circuit through contacts 15 and 37 can be used to actuate various devices, depending on the nature of the controlling condition.

When the conductivity further decreases, the contact 15 pushes the contact 37 toward the base position, the contacts remaining engaged with one another until the conductivity again increases. The circuit through the contacts 15 and 37 which results in the signal, however, is broken a predetermined period after it has been closed by opening of the timer-operated switch 46.

When, due to an increase in the conductivity, the motor again moves the metering shaft 11 and contact 15 clockwise, the contact 37 remains stationary until the pin 31 reaches a position where it engages the arm 36 and pushes it in clockwise direction, or if arm 36 has been pushed previously by contact 15 into engagement with pin 31, the arm 36 and contact 37 will start moving clockwise but at the predetermined slower rate. Thus the cycle is repeated, the contact 37 again following contact 15 at said angular distance until the conductivity reaches a maximum, which in this cycle may be the same, or higher or lower than in the previous cycle, whereupon both contacts remain in their then positions until the conductivity again declines. A predetermined period after its opening the timer-operated switch 46 is closed, so that a signal can be obtained when contact 15 again engages contact 37 on a new reverse travel.

The percentage of the maximum at which the signal is obtained can be readily adjusted to any desired value by changing the gear ratio. Gears 23 and 24 being removably affixed to the shafts 22 and 25, respectively, the entire device can be standardized, except for gears 23 and 24, which can be selected to suit each individual set of conditions.

It will be seen that the new device is adaptable to widely varying conditions. The percentage of the previously reached maximum value at which the signal is desired can be freely chosen to suit the needs of any installation. Variations in the maximum value reached by the condition in successive cycles of operation do not affect the exactness of the device, as the signal is under all circumstances obtained when the value of the condition reaches the predetermined percentage of the previously reached maximum value.

While the invention has been described for purposes of illustration in connection with electrical conductivity as the controlling condition, the invention is not limited to this application, and can be used with many other conditions, such as electrical resistance, heat, rate of flow, as the controlling condition.

Accordingly, it will be understood that I do not intend to limit the scope of the invention to the exact details of construction shown and described herein, nor to the specific control condition given as an example.

I claim:

1. A device for obtaining a signal when the value of a variable condition has dropped to a predetermined percentage of a previously reached unpredictable maximum, comprising a first and a second contact mounted for movement about a common axis of rotation, reversibly rotatable means connected in a constantly closed power circuit, the magnitude of the electromotive force available in said power circuit being controlled by said variable condition, whereby said first contact is moved about said axis of rotation through an angle proportional to the value of said condition, means operative while the value of said condition increases for moving said second contact about said axis of rotation in the same direction as said first contact and through an angle which is a predetermined percentage of the angular movement of said first contact, means effective to hold said second contact in the end position to which it has been moved during increase in said condition, said first contact during its reverse travel due to a decrease in the value of said condition engaging said second contact, a power circuit through said contacts, means in said power circuit through said contacts operative upon engagement of said contacts to give a signal, and means opening said power circuit through said contacts a predetermined period after its closing.

2. A device for obtaining a signal when the value of a variable condition has dropped to a predetermined percentage of a previously reached unpredictable maximum value, comprising reversibly rotatable metering shaft connected in a constantly closed power circuit, the magnitude of the electromotive force available in said power circuit being controlled by said variable condition, whereby said shaft is rotated through an angle corresponding to the value of said condition, a first contact rotatable with said shaft, a shaft coaxial with said metering shaft, a pin rotatable with said coaxial shaft, means effective upon rotation of said metering shaft to move said coaxial shaft in the same direction and through an angle which is a predetermined percentage of the angular movement of said metering shaft, a second contact rotatable about a center of rotation axially aligned with said coaxial shaft, friction means opposing movement of said second contact by gravity, said second contact being positioned by movement of said pin when said shafts rotate in response to an increase in the value of said condition, and being engageable by said first contact when said shafts reverse the direction of their rotation in response to a decrease in the value of said condition, a power circuit through said contacts, means in said power circuit through said contacts operative upon engagement of said contacts to give a signal, and means opening said power circuit through said contacts a predetermined period after its closing.

3. A device for obtaining a signal when a variable condition has dropped to a predetermined percentage of a previously reached unpredictable maximum value, comprising a reversibly rotatable metering shaft connected in a constantly closed power circuit, the magnitude of the electromotive force available in said power circuit being controlled by said variable condition, whereby said shaft is rotated through angles corresponding to the value of said condition, a first contact rotatable with said shaft, a first gear affixed to said metering shaft, a countershaft, a second gear affixed to said countershaft and meshing with said first gear, a third gear affixed to said countershaft, a shaft coaxial with said metering shaft, a fourth gear affixed to said coaxial shaft and meshing with said third gear, the ratio of said gears being such that the angular movement of said coaxial shaft is a predetermined percentage of the angular movement of said metering shaft, a pin rigidly connected to said coaxial shaft, a second contact rotatable about a center of rotation axially aligned with said coaxial shaft, friction means opposing movement of said second contact by gravity, said second contact being positioned by movement of said pin when said shafts rotate in response to an increase in the value of said condition, and being in the path of said first contact when said shafts reverse the direction of their rotation in response to a decrease in the value of said condition, a power circuit through said contacts, means in said power circuit through said contacts operative upon engagement of said contacts to give a signal, and means opening said power circuit through said contacts a predetermined period after its closing.

4. The apparatus of claim 3, wherein said third and fourth gears are removably affixed to said countershaft and said coaxial shaft, respectively.

5. A device for obtaining a signal when the varying conductivity of a liquid has fallen to a predetermined percentage of a previously reached unpredictable maximum value, comprising a reversibly rotatable metering shaft connected in a constantly closed power circuit, the magnitude of the electromotive force available in said power circuit being controlled by said conductivity, whereby said shaft is rotated through angles corresponding to the conductivity of said liquid, a first contact rotatable with said shaft, a shaft coaxial with said metering shaft, a pin rotatable with said coaxial shaft, means effective upon rotation of said metering shaft to move said coaxial shaft in the same direction and through an angle which is a predetermined percentage of the angular movement of said metering shaft, a second contact rotatable about a center of rotation axially aligned with said coaxial shaft, friction means opposing movement of said second contact by gravity, said second contact being mounted in such manner that upon rotation of said metering shaft in response to an increasing conductivity said pin moves said second contact through the path of travel of, and in predetermined distance to, said first contact, and upon rotation of said metering shaft in response to a decreasing conductivity said pin backs away from said second contact, and said first contact, after traveling through said predetermined distance, engages said second contact, a power circuit through said contacts, means in said power circuit through said contacts operative upon engagement of said contacts to give a signal, and means opening said power circuit through said contacts a predetermined period after its closing.

6. A device for obtaining a signal when the varying conductivity of a liquid has dropped to a predetermined percentage of a previously reached unpredictable maximum, comprising a first and a second contact, means connected in a constantly closed power circuit for reversibly moving said first contact, the magnitude of the electromotive force available in said power circuit being controlled by said conductivity, whereby said contact is moved through an angle proportional to the conductivity of said liquid, means operative while the conductivity of said liquid increases for moving said second contact in the same direction as said first contact and through an angle which is a predetermined percentage of the angular movement of said first contact, means effective to hold said second contact in the end position to which it has been moved during increase in said conductivity, the relative location of the paths through which said first and second contacts are movable being such that said first contact during its reverse travel due to a decrease in the conductivity of said liquid engages said second contact after said first contact has traveled through an angular distance equaling the difference between its angular movement and said predetermined percentage of its angular movement, a power circuit through said contacts, means in said power circuit through said contacts operative upon engagement of said contacts to give a signal, and means opening said power circuit through said contacts a predetermined period after its closing.

7. A device for obtaining a signal when the value of a variable condition has deviated a predetermined percentage from a previously reached unpredictable extreme value, comprising a first and a second contact mounted for movement about a common axis of rotation, reversibly rotatable means connected in a constantly closed power circuit, the magnitude of the electromotive force available in said power circuit being controlled by said variable condition, whereby said first contact is moved about said axis of rotation through an angle proportional to the value of said condition, means operative until said condition has reached said extreme value to move said second contact about said axis of rotation in the same direction as said first contact and through an angle which is a predetermined percentage of the angular movement of said first contact, means effective to hold said second contact in the end position it has reached when said condition has reached its extreme value, said first contact during its reverse travel due to a deviation of the value of said condition from said previously reached extreme value engaging said second contact, a power circuit through said contacts, means in said power circuit through said contacts operative upon engagement of said contacts to give a signal, and means opening said power circuit through said contacts a predetermined period after its closing.

References Cited in the file of this patent
UNITED STATES PATENTS

| | | |
|---|---|---|
| 2,283,525 | Witham | May 18, 1942 |
| 2,436,444 | Merrick | Feb. 24, 1948 |